(12) United States Patent
Entwistle

(10) Patent No.: US 7,065,781 B1
(45) Date of Patent: Jun. 20, 2006

(54) DATA TRANSPORT STREAMS PROCESSING

(75) Inventor: Paul Entwistle, Shipley (GB)

(73) Assignee: Pace Micro Technology PLC, Shipley (GB)

( * ) Notice: Subject to any disclaimer, the term of this patent is extended or adjusted under 35 U.S.C. 154(b) by 0 days.

(21) Appl. No.: 09/578,167

(22) Filed: May 24, 2000

(30) Foreign Application Priority Data

May 25, 1999 (GB) .................................. 9911989.3

(51) Int. Cl.
- H04N 7/16 (2006.01)
- H04N 7/173 (2006.01)
- H04H 1/04 (2006.01)
- H04J 1/00 (2006.01)
- H04J 3/04 (2006.01)

(52) U.S. Cl. .................. 725/135; 725/85; 725/100; 725/131; 725/134; 725/139; 725/142; 725/151; 370/486; 370/487; 370/535

(58) Field of Classification Search .................. 725/82, 725/85, 100, 120, 131, 134–135, 139–142, 725/152; 370/486–487, 535, 537–538, 540
See application file for complete search history.

(56) References Cited

U.S. PATENT DOCUMENTS

| | | | | |
|---|---|---|---|---|
| 5,754,651 A | | 5/1998 | Blatter et al. .................. 380/20 |
| 5,835,493 A | | 11/1998 | Magee et al. ................. 370/394 |
| 5,987,518 A | * | 11/1999 | Gotwald ....................... 709/230 |
| 6,002,687 A | * | 12/1999 | Magee et al. ................. 370/394 |
| 6,064,676 A | * | 5/2000 | Slattery et al. .............. 370/412 |
| 6,111,896 A | * | 8/2000 | Slattery et al. .............. 370/535 |
| 6,115,080 A | * | 9/2000 | Reitmeier .................... 348/731 |
| 6,118,786 A | * | 9/2000 | Tiernan et al. ............... 370/416 |
| 6,148,082 A | * | 11/2000 | Slattery et al. .............. 380/212 |
| 6,219,358 B1 | * | 4/2001 | Pinder et al. ................ 370/537 |
| 6,292,490 B1 | * | 9/2001 | Gratacap et al. ............. 370/412 |
| 6,351,471 B1 | * | 2/2002 | Robinett et al. ............. 370/468 |
| 6,351,474 B1 | * | 2/2002 | Robinett et al. ............. 370/486 |

FOREIGN PATENT DOCUMENTS

| | | |
|---|---|---|
| EP | 0 893 913 A1 | 1/1999 |
| EP | 0 917 355 A1 | 5/1999 |
| WO | WP 98/16067 | 4/1998 |

OTHER PUBLICATIONS

Bungum, O.W. Transmultiplexing, Transcontrol and Transscrambling of MPEG-2/DVB Signal.

Van Den Hurk et al, A Concept For Source Decoding In Digital Video Broadcast Applications.

* cited by examiner

*Primary Examiner*—John Miller
*Assistant Examiner*—Michael W. Hoye
(74) *Attorney, Agent, or Firm*—Head, Johnson & Kachigian

(57) ABSTRACT

The invention which is the subject of this application relates to the ability to utilize a receiver and processing means for received data in the reception of multiple transport streams of data. Processing components which are included in receiver apparatus are provided with the ability to only receive one transport stream of data at any one time. In the current invention, in order to present to the processing components in the receiver, one single transport stream, but still allow the receiver apparatus to receive multiple transport streams of data, there is provided a means of initially processing the received multiple streams of data which involves the steps of demultiplexing the data from the multiple transport streams, re-mapping the data, selecting packets of data in accordance with user and receiver selection criteria and then multiplexing the said selected packets of data into a single stream of data which can then be presented to the processing components.

13 Claims, 1 Drawing Sheet

Re-mapping data provided by STB processor

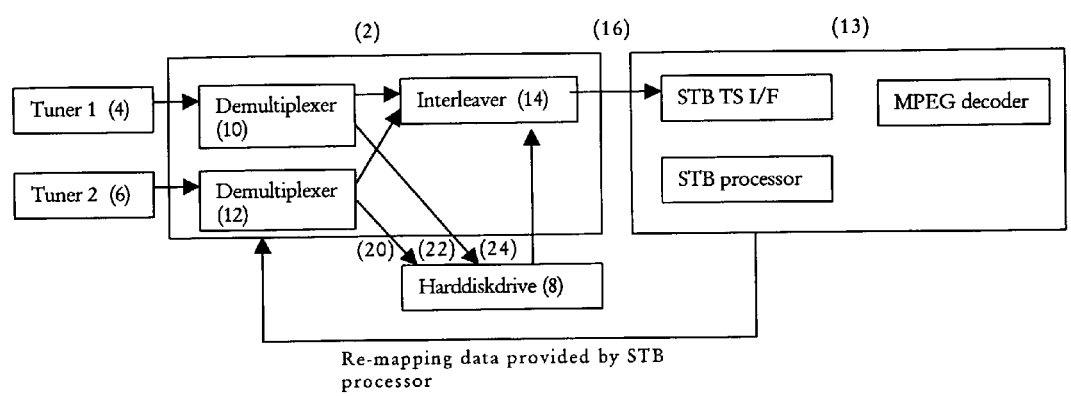

DATA TRANSPORT STREAMS PROCESSING

CROSS-REFERENCE TO RELATED APPLICATIONS

This application claims priority to British Application No. 9911989.3 filed 25 May 1999.

The invention which is the subject of this application relates to apparatus for receiving a stream of data, typically digital data, and which can be required to receive more than one stream of data without causing failure of the processing system.

Conventionally, in apparatus such as broadcast data receivers for domestic use for the reception of broadcast video, audio and/or auxiliary data and for the processing of the data for the generation of television programs on a display apparatus connected thereto, the receiver receives and processes a single transport stream of digital data. This single stream of data is transmitted from a remote location in a number of alternative ways but in each case the receiver is typically only able to receive and process a single stream of data. The stream of data may include data relating to audio and video, different program channels and so on and the data is identified in packets or groups and split by the receiver into the packets which are then processed in the appropriate manner.

In the relatively new and expanding area of broadcast digital data processing, there is a demand for the receiver to be able to receive and process more than one transport stream of data at the same time. In the present receivers as the integrated circuits used can only receive one input this is not possible and therefore there is a need for a solution to be found. It is known for relatively expensive and complex apparatus to be able to receive and process multiple transport streams of data, but this form of apparatus cannot be economically or quickly incorporated in receivers for use in large volumes for domestic use.

SUMMARY OF THE INVENTION

The aim of the present invention is to provide a receiver for transport streams of data which can be used and sold commercially on a large scale and which receiver has the capability to receive and process more than one transport stream of data and allow the generation of video and audio display or displays and/or perform other functions as selected by the user of the receiver.

In a first aspect of the invention there is provided a broadcast data receiver apparatus for receiving and processing data from a number of received data transport streams, said data broadcast from a location remote to the receiver, and said receiver incorporating processing means capable of processing a single stream of data and characterized in that said apparatus incorporates means for receiving said plurality of data transport streams and processing such that each stream is demultiplexed and re-mapped and selected portions of data from said transport streams are multiplexed into a single transport stream of data for subsequent processing in the receiver by the processing means.

In one embodiment the transport streams of data are received from any or any combination of a remote broadcast location or locations, and/or from data storage means connected to or incorporated in the receiver and/or other sources connected to or incorporated in the receiver.

Typically the single transport stream which is generated by multiplexing includes selected packets of data from the streams of data received. The packets of data may be selected automatically as they represent data which is required for the system to operate correctly, and/or in response to user selections such as to watch a particular channel, a pre recorded program and/or to record programs and it should be appreciated that another feature of the invention is the ability to split the data from the transport streams and to select to multiplex data into a single stream, store/record data and/or discard data in accordance with operating parameters at any instant.

The arrangement of the current invention allows data which has been received from a number of transport streams to be processed using integrated circuits which can accept one data input as the integrated circuits are presented with data in a single transport stream. These integrated circuits for the further processing of the data can be the same as those currently included in the receiver with no, or limited, alteration to perform processing of multiple transport streams of data which, until now, has not been possible.

Typically, the single transport data stream which is generated is presented to a single input component or components in the receiver for further processing and to allow the data to be used to perform the designated function. The designated function can be any or any combination of the generation of video displays, audio displays, recording of programs, playback of recorded programs, generation of electronic program guides, linking with internet services, e-mail, interaction with a PC, video and so on.

In a further aspect of the invention there is provided a method for the generation of a single stream of data for subsequent processing, from multiple transport streams of data, said method comprising the steps of receiving a number of transport streams of data, demultiplexing the data, remapping the data and selecting the packets of data in accordance with user and/or receiver selection criteria and multiplexing the said selected packets of data into a single stream of data.

Typically at least one of the received transport streams of data is broadcast data received from a remote location and containing any or any combination of audio, video and auxiliary services data.

The demultiplexing of the received data from each transport stream is performed in accordance with information transmitted along with the data and identified by the receiver which in turn identifies the packets of data. The remapping of the data packets' identifier takes place under control of the receiver so as to allow the required data to be multiplexed into a single stream and avoid identifier clashes between packets of data from different transport streams. The locally controlled remapping of the packet identifiers can allow the origin of the data to be subsequently identified in subsequent processing of the same.

As the receiver controls the remapping of the data, the current apparatus and method is distinguished over the prior art and the remapped packet identifiers which are generated typically do not relate to the data itself, it is provided to allow the data to be placed into a single transport stream to be presented for further processing.

BRIEF DESCRIPTION OF THE DRAWINGS

A specific embodiment of the invention is now described with reference to the accompanying diagram and example as follows.

DETAILED DESCRIPTION OF THE PREFERRED EMBODIMENT

There is provided a receiver, indicated by the general numeral 2 in the accompanying diagram, which is provided to receive broadcast transport streams of data from a first tuner 4 and a second tuner 6, both of which receive broadcast data transport streams from remote sources. A Hard Disk Drive 8 from which the receiver accepts AV data is also provided and data from this treated as data from a further transport stream as is described. When the first and second transport streams of data are received demultiplexers 10,12 are utilized for the respective streams to split, route and possibly process the packets of data from the data streams. This allows the subsequent identification and processing, by the receiver, of the PSI and SI information from the first and second transport streams.

Referring once more to the diagram and the example. The Hard Disk Drive 8 is configured to record two programs, one from each of the tuners 4,6 and is also a source of data for a pre-recorded program which is to be decoded and viewed at that time. In addition auxiliary information from the first and second transport streams is required to be sent for further processing in the receiver.

Each data stream includes groups or packets of data which are provided for a number of different purposes such as audio, visual and/or auxiliary functions. The packets of data in the transport streams are identified by Packet identifiers (PID's) which, in accordance with the invention, may need to be remapped which effectively re-identifies the same with respect to data from other transport streams so as to avoid unintentional merging of packets of data. With the transport data streams demultiplexed as described, the multiplexer/interleaver 14 is instructed to perform remapping, of the selected packet identifiers of those data packets routed to it. With selected packets remapped as required, to perform selected functions, the selected packets of data are multiplexed into a single transport stream of data 16 which can then be processed by the single input integrated circuits 13 in the processing facility within the receiver which are capable of accepting and receiving a single transport stream of data but not multiple streams of data.

The receiver further configures the demultiplexers to identify and select the packets of data relating to the auxiliary information, for example those data packets corresponding to descrambling control and management, and routes these to the interleaver 14 which inserts these packets of data into the multiplexed single transport data stream 16 and the PID's for the packets of data are changed on the basis of the receiver processing knowledge. The receiver can then manage the recording and decryption of the two programs as it is capable of monitoring the PSI/SI and auxiliary data of the two programs. It will be noted that the demultiplexed data for the programs to be recorded from the demultiplexers is sent to the Hard Disk Drive directly via paths, 20,22. In addition AV data 24 from the Hard Disk Drive is also inserted into the single data stream 16 and, as the receiver is controlling the processing of the data there is no need to construct a PSI table to identify the AV packet identifiers, as the PID's are already known and changed as required by the receiver.

The data provided below indicates the data streams which are generated in response to the example described above wherein the programs to be recorded from the two tuners are represented by the codes X1A1,X2V1 and Y4A2,Y5V2 respectively and are sent to the Hard Disk Drive to be stored. Auxiliary data represented by the codes X3PS and Y3PS is sent from the tuners to be multiplexed with data for the recorded program to be viewed which originates from the Hard disk Drive and is represented by the codes Z1A1 Z2V1. It will be noted how, when the packets of data are multiplexed the PID's are changed to S3PS, S6PS, S7A1, S8V 1 respectively Example Data Streams Tuner 1: X1A1 X2V1 X3PS X4A2 X5V2 X3PS X6A3 X7V3 X3PS X1A1 X2V1 X3PS

. . .

Demux to Interleaver: X3PS X3PS X3PS X3PS . . .

Demux to HDD: X1A1 X2V1 X1A1 X2V1 . . .

Tuner 2: Y1A1 Y2V1 Y3PS Y4A2 Y5V2 Y3PS Y6A3 Y7V3 Y3PS Y1A1 Y2V1 Y3PS.

Demux to Interleaver: Y3PS Y3PS Y3PS Y3PS . . .

Demux to HDD: Y4A2 Y5V2 . . .

HDD to interleaver: Z1A1 Z2V1 Z1A1 Z2V1 Z1A1 Z2V1 . . .

Interleaver output: S7A1 S8V1 S3PS S6PS S7A1 S8V1 S3PS S6PS S7A1 S8V1 S3PS S6PS . . .

Re-mapping table for use by the interleaver (provided by STB processor):

INPUT TAG: X1 X2 X3 Y4 Y5 Y3 Z1 Z2 . . .

OUTPUT TAG: S1 S2 S3 S4 S5 S6 S7 S8 . . .

Notice that even if the same codes are in the source streams, since the source is known a different mapping can be assigned.

Nomenclature:

X1,X2 . . . Packet identification codes for packets sourced from Tuner 1

Y1,Y2 . . . Packet identification codes for packets sourced from Tuner 2

Z1,Z2 . . . Packet identification codes for packets sourced from the hard disk drive A1,A2 . . . Audio packet belonging to programme 1,2 . . . for the specific tuner V1,V2 . . . Video packet belonging to programme 1,2 . . . for the specific tuner PS . . . System information packet (eg. SI, PSI, ECM, EMM etc.)

NB: There will be many system information packets each with different packet identification codes and clashing between the two sources, all requiring unique re-mapping. Unlike professional remultiplexing equipment, it is not necessary to adjust the contents of the data packets to reflect the remapping of the packet identifiers. Since the remapping is performed with the knowledge and under control of the STB processor, all necessary information is available to the STB to correctly interpret the packet identifications referred to in the packet data, by reference to the remapping table. This only needs to be done as and when it needs to and not for the entire data stream. It therefor represents a simpler and more cost-effective solution.

Thus the current invention allows existing processing capabilities which can only receive one transport stream of data to be utilized in apparatus which is adapted in accordance with the invention to receive data from more than one transport stream.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the of the attached claim or claims, including the full range of equivalency to which each element thereof is entitled.

The invention claimed is:

1. A broadcast data receiver apparatus for receiving and processing data from a plurality of received data transport streams, said data broadcast from a location remote to a receiver in a set-top box, and said receiver comprising:
   storage means for storing a local database in said receiver;
   each of said plurality of data transport streams including packets of data and packet identifiers for identifying said packets of data;
   processing means processing a single stream of data,
   means for receiving said plurality of data transport streams and for simultaneously processing, merging, and demultiplexing said plurality of data transport streams, selecting packets of data from said plurality of data transport streams and only remapping the packet identifiers corresponding to said selected packets of data of each stream using the local database without remapping of said packets of data, the selected packets of data and the remapped packet identifiers from said plurality of data transport streams then being multiplexed into a single transport stream of data for subsequent processing in the receiver by the processing means.

2. Broadcast data receiver apparatus according to claim 1 wherein said plurality of data transport streams are received from at least one from the group consisting of remote broadcast location or locations and/or from data storage means connected to or incorporated in the receiver and other sources connected to or incorporated in the receiver.

3. Broadcast data receiver apparatus according to claim 1 wherein said single transport stream of data which is generated by the multiplexing step includes selected packets of data from said plurality of transport streams of data received.

4. Broadcast data receiver apparatus according to claim 3 wherein said packets of data which are selected are selected automatically as they represent data which is required for said broadcast data receiver apparatus to operate correctly and/or in response to user selections.

5. Broadcast data receiver apparatus according to claim 1 wherein data from said plurality of transport streams is selected and said selected data is multiplexed into a single stream, is stored or recorded and/or is discarded in accordance with operating parameters for said broadcast data receiver apparatus at any instant.

6. Broadcast data receiver apparatus according to claim 1 wherein said processing means are integrated circuits, which accept one data input stream.

7. Broadcast data receiver apparatus according to claim 6 wherein said single transport data stream which is generated is presented to a single input component or components in said receiver for further processing and to allow the data to be used to perform a designated function.

8. Broadcast data receiver apparatus according to claim 7 wherein the designated function is selected from the group consisting of at least one of the generation of video displays, audio displays, recording of programs, playback of recorded programs, generation of electronic program guides, linking with internet services, e-mail, interaction with a personal computer, video, and/or other apparatus.

9. A method for the generation of a single stream of data for subsequent processing from received multiple transport streams of data, said method comprising the steps of:
   receiving a plurality of transport streams of data, each containing packets of data and packet identifiers in local database storage in a receiver in a set top box, simultaneously processing, merging, and demultiplexing said plurality of streams of data;
   selecting packets of data from said plurality of streams of data,
   re-mapping only the packet identifiers within the selected packets of data using the local database without remapping of said packets of data, and
   multiplexing the selected packets of data from said plurality of streams into a single stream of data, for subsequent processing.

10. A method according to claim 9 wherein at least one of the received transport streams of data is broadcast data received from a remote location containing at least one from the group consisting of audio, video and auxiliary services data.

11. A method according to claim 9 wherein demultiplexing of the received data from each transport stream is performed in accordance with information transmitted along with the data and identified by the receiver to in turn identify the packets of data.

12. A method according to claim 11 wherein the re-mapping of the data packets identifier takes place under control of the receiver so as to allow the required data to be multiplexed into a single stream and avoid identifier clashes between packets of data from different transport streams.

13. A method according to claim 12 wherein the locally controlled re-mapping of the packet identifiers allows the origin of the data to be subsequently identified in subsequent processing the same.

* * * * *